United States Patent
Dinwiddie et al.

(10) Patent No.: US 9,564,268 B2
(45) Date of Patent: Feb. 7, 2017

(54) POWER RECEIVER FOR EXTRACTING POWER FROM ELECTRIC FIELD ENERGY IN THE EARTH

(71) Applicant: Earth Energies, Inc., Johns Creek, GA (US)

(72) Inventors: John Dinwiddie, Cary, NC (US); Terry L. Wright, Suwanee, GA (US); David R. Ames, Johns Creek, GA (US)

(73) Assignee: Earth Energies, Inc., Johns Creek, GA (US)

( * ) Notice: Subject to any disclaimer, the term of this patent is extended or adjusted under 35 U.S.C. 154(b) by 0 days.

(21) Appl. No.: 14/509,772

(22) Filed: Oct. 8, 2014

(65) Prior Publication Data

US 2015/0102675 A1    Apr. 16, 2015

Related U.S. Application Data

(60) Provisional application No. 61/889,894, filed on Oct. 11, 2013.

(51) Int. Cl.
| | | |
|---|---|---|
| H02J 4/00 | (2006.01) | |
| H01F 38/14 | (2006.01) | |
| H01T 9/00 | (2006.01) | |
| H05F 7/00 | (2006.01) | |

(52) U.S. Cl.
CPC ............... *H01F 38/14* (2013.01); *H01T 9/00* (2013.01); *H01F 2038/146* (2013.01); *H05F 7/00* (2013.01); *Y10T 307/549* (2015.04)

(58) Field of Classification Search
CPC ............... H02J 4/00; H05F 7/00; H01R 4/66; E02D 5/803; E02D 5/805

USPC ........ 343/846, 849; 307/149, 151, 106–108; 52/161; 174/6, 7

See application file for complete search history.

(56) References Cited

U.S. PATENT DOCUMENTS

| | | | | |
|---|---|---|---|---|
| 29,793 | A * | 8/1860 | Vion ..................... | B23B 51/02 |
| | | | | 408/212 |
| 126,356 | A * | 4/1872 | Ward ................... | G05B 11/016 |
| | | | | 174/4 R |
| 414,943 | A * | 11/1889 | Dewey ................. | G05B 11/016 |
| | | | | 174/3 |
| 645,576 | A * | 3/1900 | Tesla ................... | H04L 25/4902 |
| | | | | 375/259 |
| 674,427 | A * | 5/1901 | Palencsar ............. | G05B 11/016 |
| | | | | 174/4 R |

(Continued)

FOREIGN PATENT DOCUMENTS

| | | | |
|---|---|---|---|
| DE | 102008029441 A1 * | 12/2009 | ............... H05F 7/00 |
| WO | 2008005628 A2 | 1/2008 | |

OTHER PUBLICATIONS

Patent Translation for DE102008029441, EPO ESPACENET, Printed Sep. 23, 2016.*

*Primary Examiner* — Fritz M Fleming
(74) *Attorney, Agent, or Firm* — Coats and Bennett, PLLC

(57) ABSTRACT

A resonant transformer connected between a ground terminal and elevated terminal draws current from the earth's electric field through a primary winding of the transformer. An impulse generator applies a high voltage impulse to the primary winding of the resonant transformer to cause current to flow from the ground terminal through the primary winding. The flow of current through the primary winding of the resonant transformer induces a current in the secondary winding, which may be converted and filtered to a usable form, e.g. 60 Hz AC or DC.

12 Claims, 8 Drawing Sheets

(56) References Cited

U.S. PATENT DOCUMENTS

| | | | | |
|---|---|---|---|---|
| 690,151 | A * | 12/1901 | Jahr | H01M 10/44 |
| | | | | 429/10 |
| 911,260 | A * | 2/1909 | Pennock | G05B 11/016 |
| | | | | 174/3 |
| 1,119,732 | A * | 12/1914 | Tesla | H01Q 1/38 |
| | | | | 200/48 R |
| 1,540,998 | A * | 6/1925 | Plauson | H05F 7/00 |
| | | | | 310/309 |
| 2,396,276 | A * | 3/1946 | Lang | E02D 5/805 |
| | | | | 411/470 |
| 2,580,948 | A * | 1/1952 | Pancake | E01F 9/0117 |
| | | | | 248/156 |
| 2,660,276 | A * | 11/1953 | McKee | E02D 5/803 |
| | | | | 52/159 |
| 3,526,069 | A * | 9/1970 | Deike | E02D 5/805 |
| | | | | 405/244 |
| 3,628,337 | A * | 12/1971 | Stepanich | E02D 5/54 |
| | | | | 254/41 |
| 3,801,893 | A | 4/1974 | Joyce | |
| 4,189,650 | A | 2/1980 | Aaland | |
| 4,733,102 | A | 3/1988 | Nakayama et al. | |
| 4,885,428 | A | 12/1989 | Roberts | |
| 5,367,245 | A * | 11/1994 | Mims | H02J 15/00 |
| | | | | 307/149 |
| 6,586,900 | B2 | 7/2003 | Rider et al. | |
| 7,053,576 | B2 | 5/2006 | Correa et al. | |
| 7,439,712 | B2 * | 10/2008 | McCowen | H02N 1/10 |
| | | | | 174/2 |
| 7,466,032 | B2 * | 12/2008 | Wadle | H02N 11/002 |
| | | | | 290/1 A |
| 8,004,250 | B2 | 8/2011 | Grandics | |
| 2007/0170910 | A1 | 7/2007 | Chang et al. | |
| 2008/0191580 | A1 * | 8/2008 | Deyo | H02N 11/002 |
| | | | | 310/300 |
| 2010/0207399 | A1 | 8/2010 | Grandics | |
| 2011/0316430 | A1 | 12/2011 | Cohen et al. | |

\* cited by examiner

POWER RECEIVER FOR EXTRACTING POWER FROM ELECTRIC FIELD ENERGY IN THE EARTH

This application claims the benefit of U.S. Provisional Application No. 61/889,894, filed 11 Oct. 2013, the disclosure of which is incorporated herein by reference in its entirety.

TECHNICAL FIELD

The present invention relates generally to renewable energy, and more particularly to methods and apparatus for extracting energy from subsurface electrical fields beneath the earth's surface.

BACKGROUND

The earth and the ionosphere cavity may be viewed as a global electric circuit. Electrical currents are constantly flowing within the earth and its atmosphere. Within the earth, the majority of the earth's energy is carried by extremely low frequency (ELF) and ultralow frequency (ULF) waves in the 0-200 Hz frequency range. The earth's rotating magnetic field and positive lightning are two energy sources that sustain the ELF/ULF waves within the earth and the atmosphere.

A great deal of research has been devoted to studying the electric field present in the earth's ionosphere cavity. Joseph M. Crawley, the "Fair Weather Atmosphere as a Power Source", Proceedings ESA Annual Meeting on Electrostatics 2011; O. Jefimenko, "Operation of Electric Motors from Atmospheric Electric Field," American Journal of Physics, Vol. 39, Pgs. 776-779, 1971; M. L. Breuer, "Usability of Tapping Atmospheric Charge as a Power Source," Renewable Energy, Vol. 28, Pgs. 1121-1127, 2003. Numerous attempts have been made in the past to extract electrical energy from the earth's atmosphere. For example, U.S. Pat. No. 1,540,998 to Plauson describes a system for converting atmospheric electrical energy into usable power. These past attempts have been successful in producing only small amounts of power from the electrical field in the earth's ionosphere cavity. The modest success of these experiments compared to results from other renewable energy sources, such as solar and wind, has tempered further research and prevented widespread use of the electric field in the ionosphere cavity as an energy source.

SUMMARY

The present invention relates to a power receiver for extracting power from electric fields beneath the earth's surface. In embodiments of the present disclosure, a resonant transformer connected to a ground terminal draws current from the earth's electric field through the primary winding of the transformer. Current flow through the resonant transformer is induced by applying a high voltage impulse to the primary winding. The flow of current through the primary winding of the resonant transformer induces a current in the secondary winding, which may be converted and filtered to a usable form, e.g. 60 Hz AC or DC.

In some embodiments of the power receiver, the resonant frequency of the resonant transformers is below 200 Hz.

In some embodiments of the power receiver, the resonant transformer comprises a ferro-resonant transformer.

In some embodiments, the power receiver further comprises an elevated terminal.

In some embodiments of the power receiver, the primary winding of the resonant transformer is connected between the ground terminal and elevated terminal.

In some embodiments of the power receiver, the elevated terminal comprises an upper capacitive plate coupled to the earth's ionosphere cavity.

In some embodiments of the power receiver, the impulse generator comprises the upper capacitive plate and a spark gap connected between the upper capacitive plate and the primary winding of the resonant transformer. The spark gap comprises a pair of electrodes separated by a gap and configured to generate a spark when a voltage difference between the electrodes reaches a predetermined level.

In some embodiments of the power receiver, the impulse generator comprises a pulse generator for generating low voltage pulses, a step-up transformer for converting the low voltage pulses provided by the pulse generator to high voltage impulses, and a spark gap connected between the step-up transformer and the primary winding of the resonant transformer to generate a spark responsive to the high voltage impulses from the step-up transformer.

In some embodiments of the power receiver, the impulse generator comprises a pulse generator for generating low voltage pulses, and a step-up transformer connected to the primary winding of the resonant transformer for converting the low voltage pulses provided by the pulse generator to high voltage impulses.

In some embodiments of the power receiver, the impulse generator comprises a solid state spark generator.

In some embodiments of the power receiver, the resonant transformer includes a capacitor connected in parallel with the primary winding.

In some embodiments of the power receiver, the resonant transformer includes a capacitor connected in series with the primary winding between the impulse generator and the elevated terminal.

In some embodiments, the power receiver comprises multiple resonant transformers having primary windings connected in parallel between the ground terminal and the elevated terminal.

In some embodiments of the power receiver, the resonant transformers have different resonant frequencies.

In some embodiments of the power receiver, the resonant frequencies of the resonant transformers are all below 200 Hz.

In some embodiments of the power receiver, the resonant frequencies of the resonant transformers are matched to respective Schumann resonances.

Another embodiment of the power receiver comprises a resonant circuit connected to a ground terminal disposed below the surface of the earth, an impulse generator for generating and applying a high voltage electrical impulse to the resonant circuit to induce current flow from the ground terminal through the resonant circuit, and a power conversion circuit connected to the resonant circuit to convert electrical current flowing through the resonant circuit to a desired form. The resonant circuit has a resonant frequency below 200 Hertz.

In some embodiments of the power receiver, the resonant circuit comprises a resonant transformer having a primary winding, a secondary winding, and resonant capacitor connected in series with the primary winding.

In some embodiments of the power receiver, the resonant circuit comprises multiple resonant transformers having primary windings connected in parallel to the ground terminal.

In some embodiments of the power receiver, the resonant transformers have different resonant frequencies.

In some embodiments of the power receiver, the resonant frequencies of the resonant transformers are all below 200 Hz.

In some embodiments of the power receiver, the resonant frequencies of the resonant transformers are matched to respective Schumann resonances.

Other embodiments of the disclosure comprise a ground terminal for a power receiver. In one embodiment, the ground terminal comprises a ground shaft configured for insertion beneath the surface of the earth, a hollow cylinder surrounding the ground shaft and having a plurality of openings, and a plurality of ground wires connected at one end to the ground shaft. The ground wires are wound around the ground shaft and have free ends protruding through respective openings in the hollow shaft so that rotation of the ground shaft relative to the hollow cylinder causes the ground wires to extend radially into the earth.

Other embodiments of the disclosure comprise methods of extracting power from the earth. In one embodiment, the method comprises applying a high voltage impulse to resonant circuit coupled to a ground terminal disposed beneath the surface of the earth to initiate resonance in the resonant circuit and induce the flow of current from the ground terminal to the resonant circuit, and converting the current flowing from the ground terminal into the resonant circuit into a useful form.

In some embodiments of the method, the resonant circuit comprises a resonant transformer including a primary winding coupled to the ground terminal and a second winding coupled to a power converter, and applying a high voltage impulse to resonant circuit comprises applying a high voltage impulse to the primary winding of the resonant transformer.

In some embodiments of the method, applying a high voltage impulse to the primary winding of the resonant transformer comprises applying an impulse in the range to 10,000 to 40,000 volts to primary winding of the transformer.

DETAILED DESCRIPTION

Figure 1:
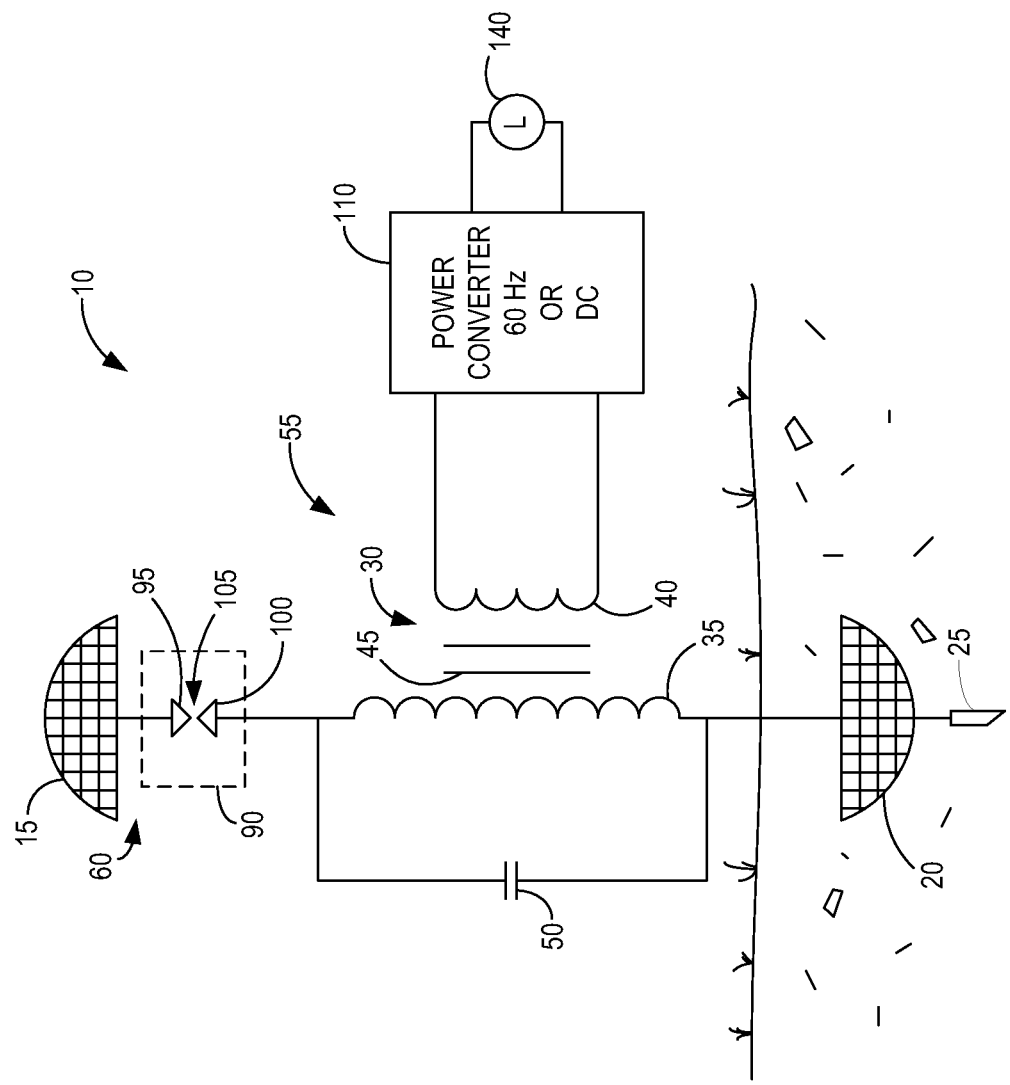
FIG. 1 illustrates a first exemplary embodiment of a power receiver.

Referring now to the drawings, a power receiver for extracting energy from the earth's electric field are illustrated and indicated generally by the numeral 10. Various embodiments of the power receiver 10 are described and similar reference numbers are used throughout the description to indicate similar components.

The power receiver 10 converts energy in the ELF/ULF waves to useful form, e.g. 60 Hz AC or DC. The power receiver 10 is essentially a resonance circuit that resonates at the natural resonance frequencies in the earth's electric field. These resonance frequencies, known as Schumann resonance frequencies, occur at 7.83 Hz, 14.3 Hz, 20.8 Hz, 27.3 Hz, and 33.8 Hz. A high voltage impulse initiates resonance within the power receiver 10. In the resonant mode, the impedance of the power receiver 10 is reduced to near zero thus inducing ground currents to flow into the power receiver 10 where the ground currents are converted to useful form.

FIG. 1 illustrates a first embodiment of the power receiver 10. The power receiver 10 comprises a resonant transformer 30 connected between an elevated terminal 15 and ground terminal 25. In this embodiment, the elevated terminal 15 is capacitively coupled to electric fields within the earth's ionosphere cavity and functions as an upper capacitive plate. A lower capacitive plate 20 is connected to the ground terminal 25 beneath the surface of the earth.

The resonant transformer 30 comprises a primary winding 35, secondary winding 40, ferromagnetic core 45, and capacitor 50. One end of the primary winding 35 is connected to the lower capacitive plate 20 and ground terminal 25. The opposite end of the primary winding 35 is connected via a spark gap 90 to the elevated terminal 15. The capacitor 50 is connected in parallel with the primary winding 35 of the resonant transformer 30 to form an LC circuit 55 with a resonance frequency range of between about 0.1 and 200 Hz. In a preferred embodiment, the resonant transformer has a Q of about 10 or greater and resonance frequency in the range of about 0.1-200 Hertz. For example, the resonant transformer 30 may have a resonance frequency of about 7.83 Hz, the fundamental Schumann resonance frequency. The secondary winding 40 of the resonant transformer 30 is connected to a power converter 110 as will be hereinafter described in greater detail. The power converter 110 converts the energy extracted from the earth's electric field by the power receiver 10 into a usable form for driving a load 140.

The elevated terminal/upper capacitive plate 15 comprises an insulated, dish-shaped plate with a large radius of curvature. The capacitance and resistance of the elevated terminal is chosen for receiving broadband electric field frequencies in the 0-200 Hz range. The upper capacitive plate 15 is sized to maximize to the extent practical coupling with the electric field in the earth's ionosphere cavity.

The lower capacitive plate 20 is also a dish-shaped plate with a large radius of curvature. One function of the lower capacitive plate 20 is to collect charge from the earth's ground currents and provide an instantaneous source of current as hereinafter described. The capacitance and resistance of the lower capacitive plate 20 is selected to promote the flow of current from the ground with minimal losses.

The spark gap 90 connected between the elevated terminal 15 and resonant transformer 30 comprises a pair of electrodes 95, 100 separated by an evacuated air gap 105. Electrode 95 is connected to the upper capacitive plate 15. Electrode 100 is connected to the resonant transformer 30. The spark gap 105 prevents electrical discharge from the upper capacitive plate 15 to the earth's ionosphere cavity. The spark gap 90 in combination with the elevated terminal 15 function as an impulse generator that applies a high voltage impulse of about 10,000-40,000 volts to the primary winding 35 to initiate resonance in the transformer 30.

In operation, the capacitive coupling of the upper capacitive plate 15 induces a high voltage operating current in the upper capacitive plate 15. The upper capacitive plate is connected to a first electrode 95 to the spark gap 90. When the voltage difference between the electrodes 95 and 100 reaches a threshold, a spark forms across the electrodes 95,100 and a high voltage impulse is applied to the primary winding 35 of the resonant transformer 30. This high voltage impulse initiates resonance within the transformer 30.

In resonant mode, the impedance of the resonance transformer is reduced to nearly zero allowing current to flow from the capacitive plate 20 and ground terminal 25 through the primary winding 35 of the transformer 30, which in turn induces current in the secondary winding 40. Power converter 110 converts the current flowing through the secondary winding 40 into a usable form for driving a load 140. The transformer 30 will continue to resonate for a short period of time. By providing high voltage impulses to the primary winding 35 of the resonant transformer 30 at periodic intervals, it is possible to maintain a continuous flow of current from the earth into the resonant transformer 30, thus producing a continuous supply of power.

Figure 2:
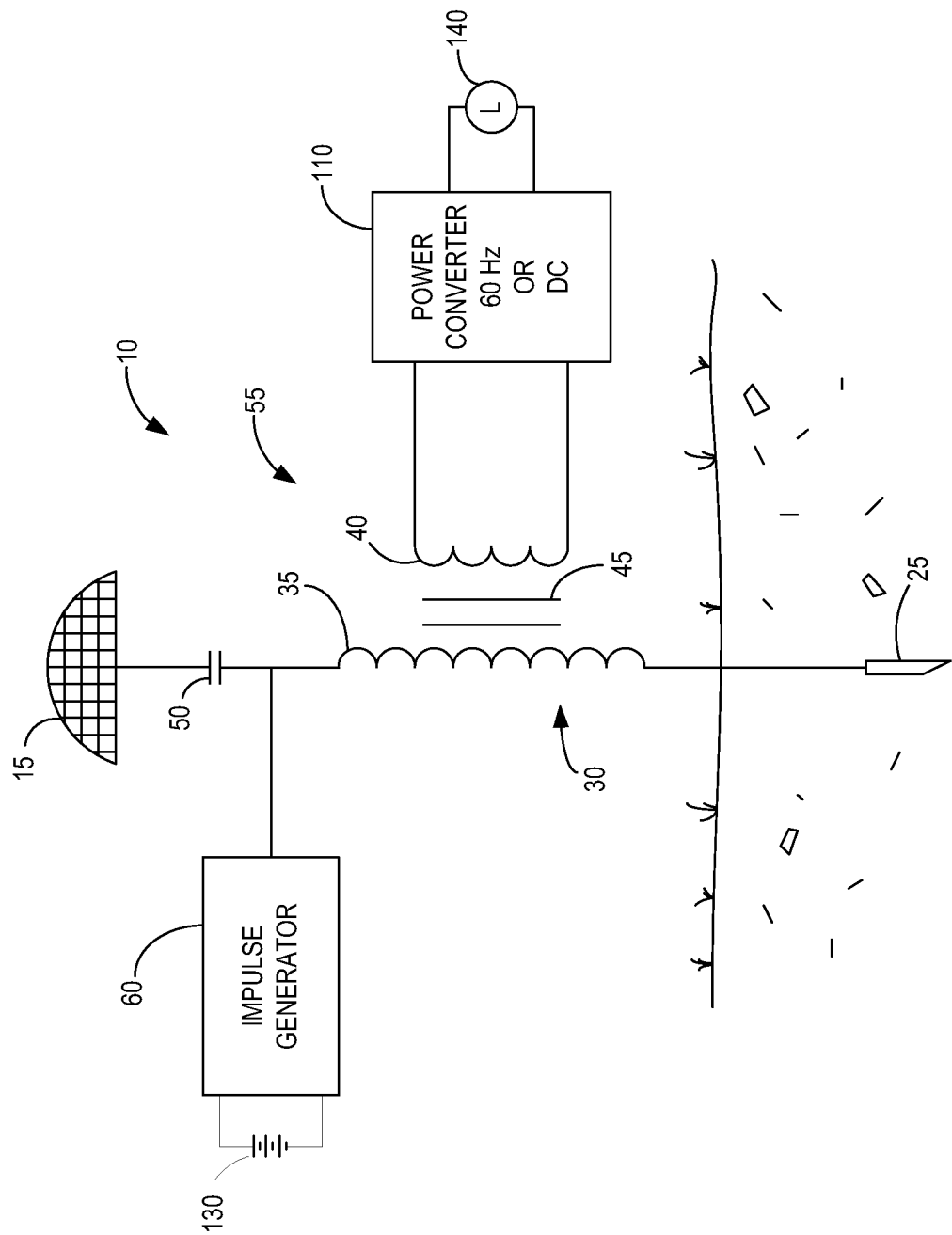
FIG. 2 illustrates a second exemplary embodiment of a power receiver.

FIG. 2 discloses a second embodiment of the primary receiver 10. This embodiment includes a resonant transformer 30 connected between an elevated terminal 15 and ground terminal 25. The resonant transformer 30 comprises a primary winding 35, secondary winding 40, ferromagnetic core 45 and a high voltage capacitor 50. One end of the primary winding 35 is connected to the ground terminal 25. The opposite end of the primary winding 35 is connected to the elevated terminal 15. The capacitor 50 has a capacitance of about 0.01 micro-farads. In contrast to the previous embodiment, capacitor 50 is connected in series with the primary winding 35 and elevated terminal 15 and forms a LC circuit 55 with a Q of about 10 or greater and a resonance frequency in the range of about 0.1 to 200 Hz. In a preferred embodiment, the resonance frequency of the transformer 30 is 7.83 Hz, the fundamental Schumann resonance frequency. An impulse generator 60 is connected between the primary winding 35 of the resonant transformer 30 and the series capacitor 50 and applies a high voltage impulse to the primary winding 35 of the resonant transformer 30. A battery 130 or other external power source supplies power to the impulse generator 60. As previously described, the high voltage impulse applied by the impulse generator 60 initiates resonance within the resonant transformer 30 inducing current flow from the ground terminal 25 into the primary winding 35 of the resonant transformer 30. The flow of current from the ground terminal 25 through the primary winding 35 induces current in the secondary winding 40. Power converter 110 converts the electrical energy in the current flowing through the primary winding 40 into a usable form.

In contrast to the first embodiment, it is not required to capacitively couple the elevated terminal 15 in the second embodiment to the earth's ionosphere cavity. Rather, the elevated terminal 15 in this embodiment provides lightning protection and dissipates some of the energy flowing into the power receiver 10 to the earth's ionosphere cavity. Also, in contrast to the first embodiment, the capacitor 50 is connected in series between the primary winding 35 of the transformer 30 and the elevated terminal 15. Those skilled in the art will appreciate that the capacitor 50 could also be connected in parallel rather than series with the primary winding 35 as shown in FIG. 1. Another difference is that the impulse generator 60 has an external power source. The amount of energy generated by the power receiver 10, however, is far greater than the energy needed to generate high voltage impulses. The first embodiment does not require an external power source to generate high voltage impulses.

Figure 3:
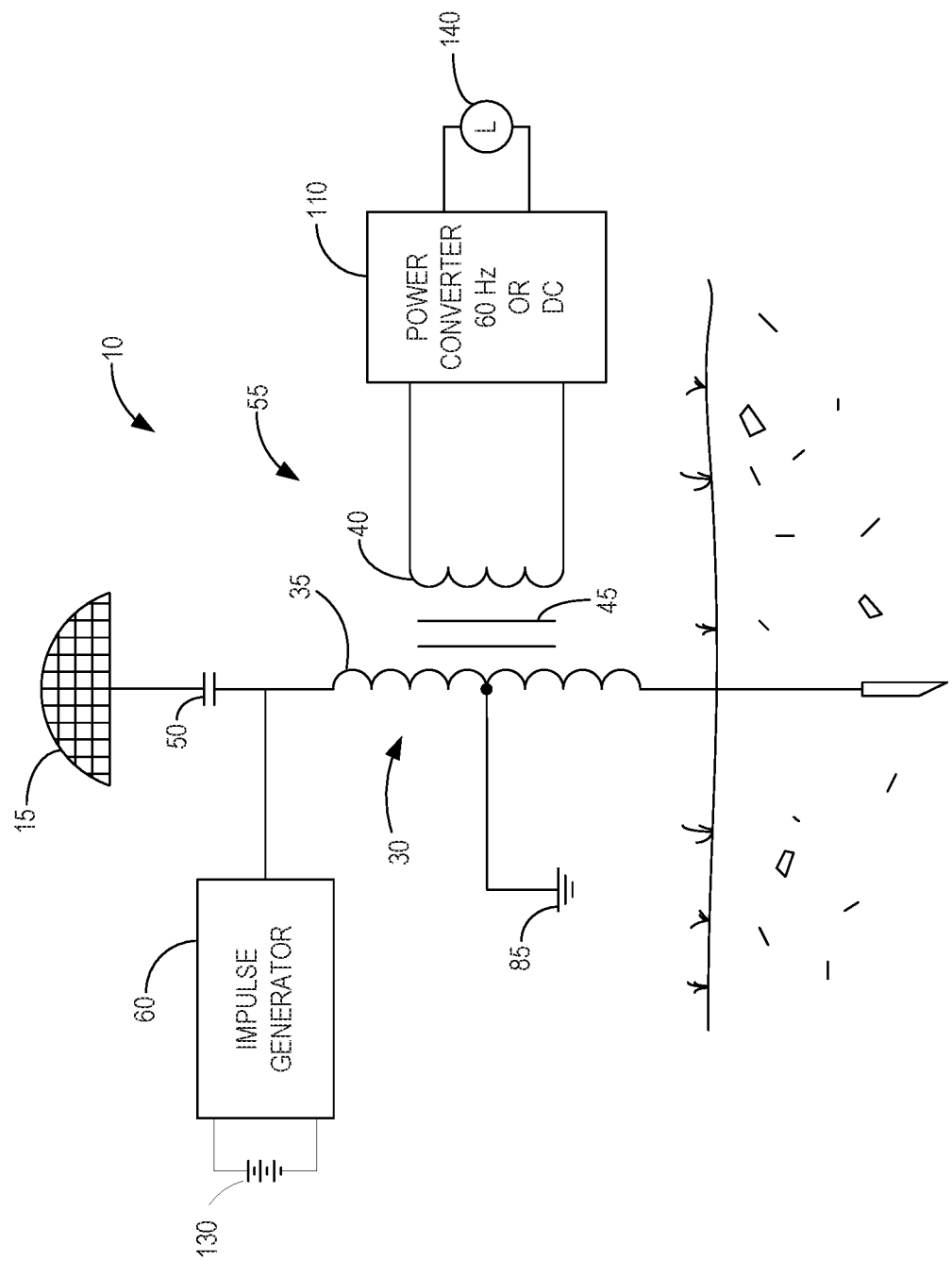
FIG. 3 illustrates a third exemplary embodiment of a power receiver.

FIG. 3 illustrates a third embodiment of the power receiver 10. This embodiment is essentially the same as the embodiment shown in FIG. 2. The main difference is that a center tap of the primary winding 35 in the resonant transformer 30 is connected to an electrical ground 85. It should be appreciated that the electrical ground 85 may be different than the earth ground. When the center tap of the resonant transformer 30 is grounded at a distance away from the ground terminal 25 (e.g. 50 ft to 100 ft), the power receiver 10 becomes a transmitter via the ground loop formed.

Figure 4:
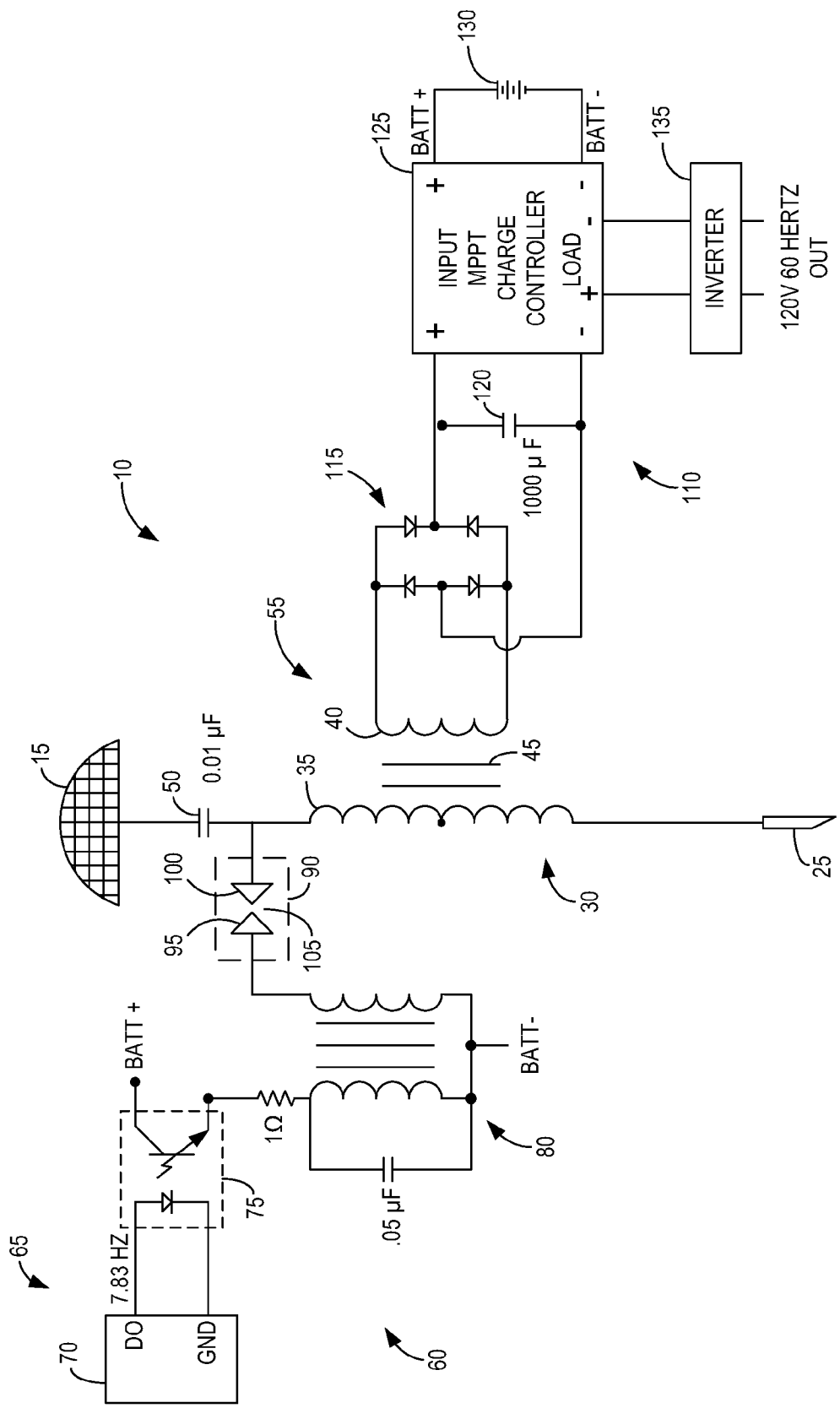
FIG. 4 illustrates a fourth exemplary embodiment of a power receiver.

FIG. 4 illustrates the power receiver 10 of FIG. 2 in greater detail. The power receiver includes a resonant transformer 30 connected between a ground terminal 25 and an elevated terminal 15. The resonant transformer 30 includes a primary winding 35, secondary winding 40, ferromagnetic core 45 and series capacitor 50 configured as previously described. The resonant transformer 30 may have a Q of about 10 and a resonance frequency in the range of about 0.1 to 200 Hz. The resonant transformer 30 may be made using an Allanson transformer (part #1530BP120R) connected in series with a 0.01 micro-farad capacitor, such as the Condensor Products high voltage capacitor (part #TC 103-17-125). An impulse generator 60 is connected between the primary winding 35 of the resonant transformer 30 and the series capacitor 50 and applies a high voltage impulse in the range of about 10,000 to 40,000 volts to the primary winding of the transformer 30. A battery 130 or other external power source supplies power to the impulse generator 60. The power converter 110 connects to the secondary winding 40 of the resonant transformer 30 for converting current in the secondary winding of the transformer to a useful form.

The impulse generator 60 comprises a pulse generator 65 for generating low voltage pulses, a step-up transformer 80 for converting the low voltage pulses from the pulse generator 65 to high voltage pulses, and a spark gap 90 for generating sparks responsive to the high voltage pulses from the step-up transformer 80.

The pulse generator 65 comprises a square wave generator 70 and solid state relay 75. The square wave generator 70 generates a digital pulse stream. In one embodiment, the digital pulse stream generates a square waveform with a frequency of about 7.83 Hz. The frequency of the digital pulse stream is selected to match the resonance frequency of the transformer 30, though such is not necessarily required. The pulse stream output from the square wave generator 70 is applied to the solid state relay 75. The solid state relay 75 is connected between a battery or other power source and a first winding of the step-up transformer 80. The solid state relay 75 functions as a switch that is activated responsive to the waveform from the square wave generator 70 to provide a continuous stream of low voltage pulses from the battery to the first winding of the step-up transformer 80. A 1 ohm resistor is connected between the solid state relay 75 and step-up transformer 80.

The step-up transformer 80 converts the low voltage pulses from the pulse generator 65 to high voltage pulses that are applied to the spark gap 90. The step-up transformer has a 0.5 micro-farad capacitor connected in parallel with the primary winding of the step-up transformer 80. The step-up transformer produces pulses at the output of about 30,000 to 40,000 volts.

The spark gap 90 comprises a pair of electrodes 95, 100 separated by an air gap 105. As previously described, when the voltage potential between the electrodes 95, 100 reaches a threshold, a spark forms between the electrodes 95, 100 and supplies a nearly instantaneous, high voltage impulse to the primary winding 35 of the resonant transformer 30. This high voltage impulse initiates resonance in the resonant transformer 30 inducing current flow from the ground terminal 25 through the primary winding 35 of the resonant transformer 30.

The power converter 110 comprises a bridge rectifier 115, filter capacitor 120, charge controller 125, and inverter 135. The bridge rectifier 115 converts the AC current flowing through the secondary winding 40 of the resonant transformer to a DC current. a Filter capacitor 120 removes unwanted frequencies from the DC current. The filter capacitor 120 has a capacitance of about 1000 micro-farads. The DC current is input to the charge controller 125. The charge controller 125 may, for example, comprise a maximum power point tracking (MPPT) charge controller, which is commonly used in solar power generating systems. The charge controller 125 applies a small amount of energy to a battery 30 to charge the battery 130. As previously noted, the battery 130 serves as a power source for the impulse generator 60. The remaining current is supplied to an inverter 135, which converts the DC current to an AC current with a desired voltage and frequency, e.g., 120 volts/60 Hz AC. The power converter 110 as shown in FIG. 4 may be utilized in the embodiment shown in FIGS. 1, 2 and 3.

Figure 5:
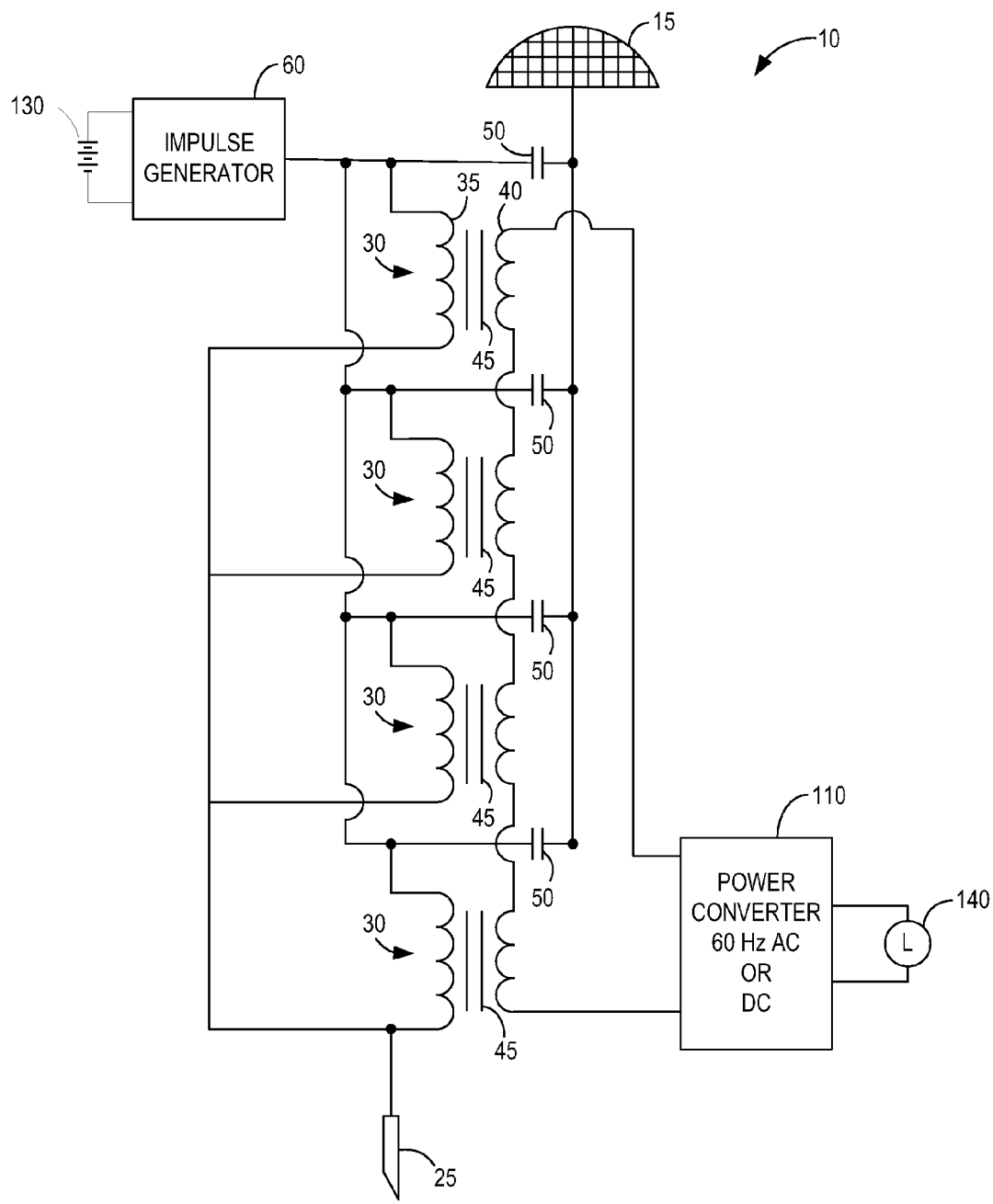
FIG. 5 illustrates a fifth exemplary embodiment of a power receiver.

FIG. 5 illustrates a power converter 10 according to another embodiment. The power converter 10 comprises a plurality of resonant transformers 30 connected between a ground terminal 25 and elevated terminal 15. Each of the resonant transformers 30 comprises a primary winding 35, secondary winding 40, ferromagnetic core 45 and series capacitor 50. The primary windings 35 of the resonant transformers 30 are connected in parallel. The secondary windings 40 are connected in series with the power converter 110. An impulse generator 60 applies a high voltage impulse to the primary windings 35 of the resonant transformers 30. A battery 130 or other external power source supplies power to the impulse generator 60. The power converter 110 converts the current in the power converter circuit to a usable form for driving a load 140.

In one embodiment, each of the resonant transformers 30 shown in FIG. 5 is configured to have a different resonant frequency. In one embodiment, the resonant transformers 30 are configured to resonate at frequencies of 7.83 Hz, 14.8 Hz, 20.3 Hz and 26.8 Hz respectively. Additional resonant transformers 30 could be added to operate at other resonance frequencies.

Figure 6A:
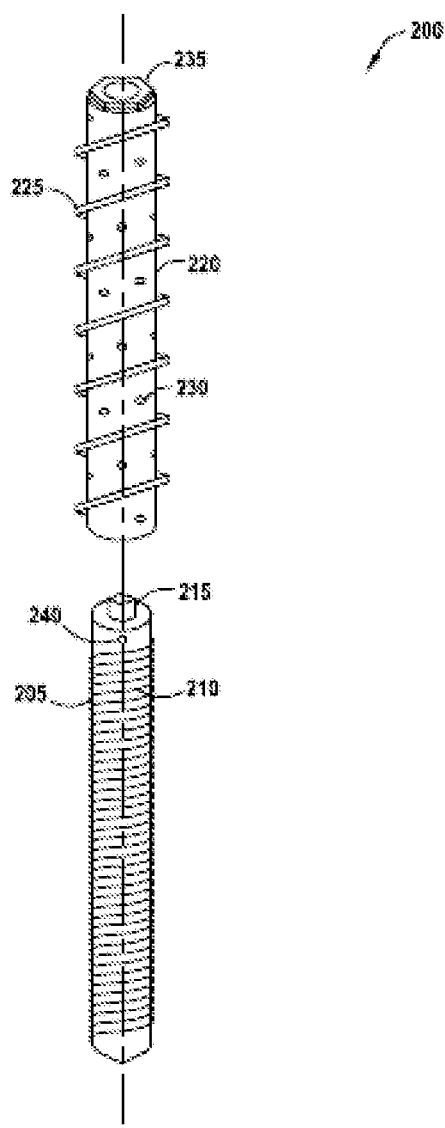
FIG. 6A is an exploded perspective view of an exemplary ground antenna array for the power receiver.
Figure 6C:
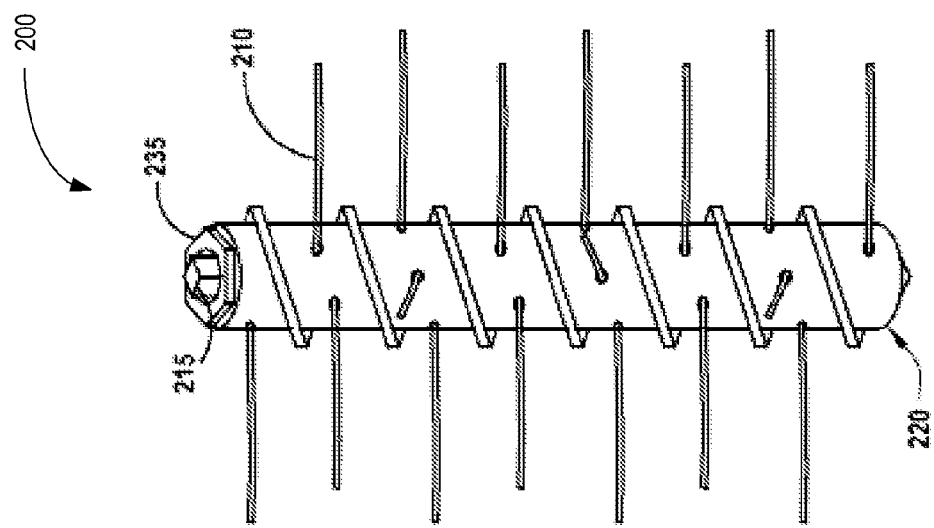
FIG. 6C is a perspective view of an assembled ground antenna array after being deployed.
Figure 6B:
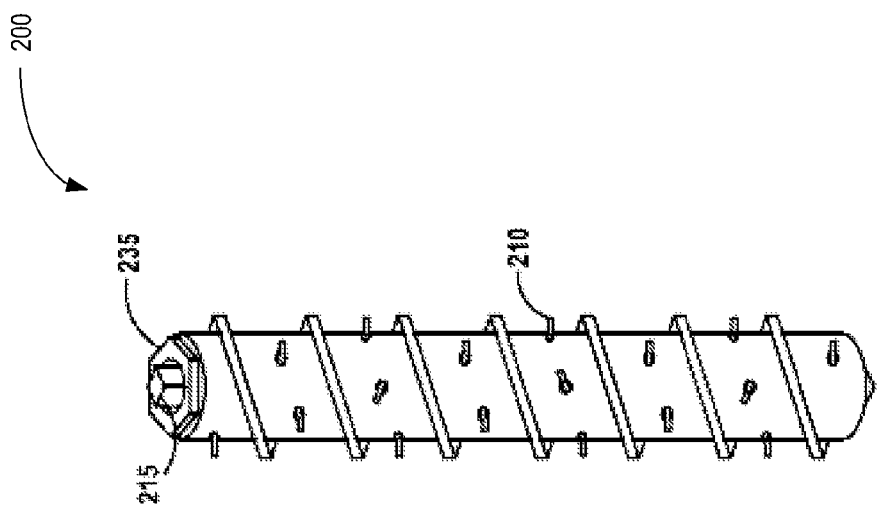
FIG. 6B is a perspective view of an assembled ground antenna array before being deployed.

FIGS. 6A-6C illustrate a high quality ground antenna array 200 which may be used as a ground terminal 25. The ground antenna array 200 comprises a generally cylindrical ground shaft 205 disposed with a hollow cylinder 220 and a plurality of reinforced, heavy gauge ground wires 210 attached at one end to the ground shaft 205. The ground shaft 205 and ground wires 210 should be highly conductive and have low resistance to supply current from the ground to the power receiver 10. In one embodiment, the ground wires 210 may be copper or other highly-conductive metal. The end of the ground shaft may be pointed to facilitate insertion into the earth. A connection port on the ground shaft 220 is provided to electrically connect the ground antenna array 220 to the resonant transformer 30.

The hollow cylinder 220 has external threads 25 to facilitate insertion into the ground. A rotator nut 235 is fixedly secured to the top end of the hollow shaft 220. A square shaft 215 protrudes from the top end of the ground shaft 205 into the opening in the rotator nut 235. FIG. 6B. A tool 250, shown in FIG. 7, engages with the rotator nut 235 and square shaft 215 during insertion of the ground antennas array 200 into the ground as will be hereinafter described.

Figure 7A:
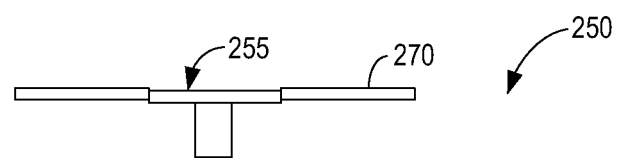
FIG. 7A is a side view of an insertion tool for installing the ground antenna array.
Figure 7B:
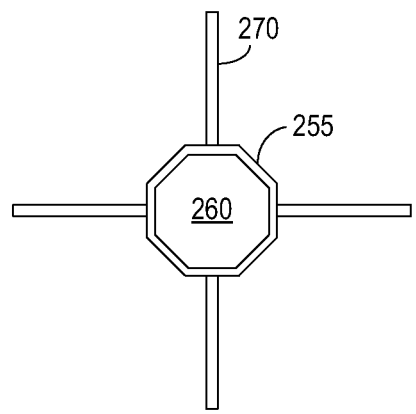
FIG. 7B is a top view of the insertion tool for installing the ground antenna array.
Figure 7C:
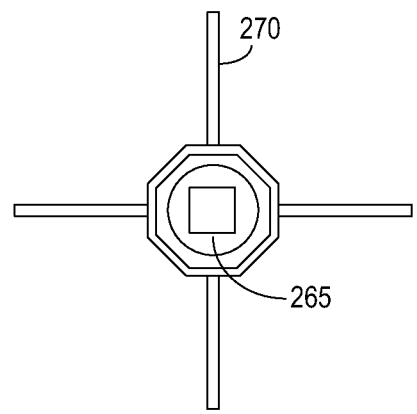
FIG. 7C is a bottom view of the insertion tool for installing the ground antenna array.

The insertion tool 250 is shown in FIG. 7. The insertion tool 250 includes a tool body 255 having a first socket 260 on one side to fit the rotator nut 235 on the hollow cylinder 220 and a second socket 265 on the other side to fit the square shaft 215 on the ground shaft 205. Arms 270 extend from the outer periphery of the tool body 255 for manually or mechanically turning the insertion tool 250.

Before the antenna array 200 is deployed, the ground wires 210 are wound around the ground shaft 205 with the free ends protruding slightly from respective openings 230 in the hollow cylinder 220 to a distance not to exceed one half (½) the depth of the external threads 225 on the hollow cylinder 220. FIG. 6B illustrates the ground antenna array 200 before deployment. FIG. 6C illustrates the ground antenna array in a deployed configuration.

Installation of the ground antenna array 200 is performed in two stages. In the first stage, a hole slightly smaller in diameter than the threads 235 of the hollow cylinder 220 is drilled into the Earth to a depth matching the length of the hollow cylinder 220 or slightly longer. The hole is filled with water and the water is allowed to soak into the soil. After the ground is softened, the hollow cylinder 220 is rotated using the insertion tool 250 to insert the ground antenna array 200 into the ground. The first socket 260 of the insertion tool 250 is engaged with the rotator nut 230 and the insertion tool 250 is turned by hand or a mechanized rotating shaft fitted and attached to the tool arms 270 to thread the ground assembly into the hole. During the initial insertion of the ground antenna array 200, the ground shaft 205 is fixed to the hollow shaft 220 and rotates with the hollow shaft. The hollow cylinder 220 is rotated until it reaches the full depth of the hole.

Once the ground antenna array 200 has been fully inserted into the earth, the insertion tool 250 is flipped over and the second socket 265 of the insertion tool 250 is engaged with the square shaft 215. The insertion tool 250 is turned by hand or a mechanized rotating shaft fitted and attached to the tool arms 270 to rotate the ground shaft 205. During the second phase, the ground shaft 205 rotates freely inside the hollow cylinder 220. Rotation of the ground shaft 205 causes the reinforced ground wires 210 to extend radially into the earth. The ground shaft 220 is rotated until the ground wires are fully extended. The ends of the ground wires may be sharpened to aid in the extension of the ground wires during the second phase.

After the ground antenna array 200 is deployed, a connection cable 280 is attached to a connection port 240 on the ground shaft 220 to electrically connect the ground antenna array 220 to the resonant transformer 30 in the power receiver 10.

What is claimed is:

1. A power receiver for extracting electrical energy from the earth's electric field, said power receiver comprising:
   a resonant transformer connected to a ground terminal disposed below the surface of the earth;
   an impulse generator for generating and applying a high voltage electrical impulse to a primary winding of the resonant transformer to induce current flow from the ground terminal through the primary winding of the transformer, said impulse generator comprising:
a signal generator for generating a low voltage signal;
a step-up transformer for converting the low voltage signal to a high voltage signal;
a spark gap connected between the step-up transformer and the primary winding of the resonant transformer to generate a spark responsive to the high voltage signal from the step-up transformer; and
a power conversion circuit connected to a secondary winding of the resonant transformer to convert electrical current flowing through the secondary winding to a desired form.

2. The power receiver of claim 1 wherein a resonant frequency of the resonant transformers is below 200 Hz.

3. The power receiver of claim 1 wherein the resonant transformer comprises a ferro-resonant transformer.

4. The power receiver of claim 1 further comprising an elevated terminal, and wherein the primary winding of the resonant transformer is connected between the ground terminal and elevated terminal.

5. The power receiver of claim 4 wherein the elevated terminal comprises an upper capacitive plate coupled to the earth's ionosphere cavity.

6. The power receiver of claim 1 wherein said resonant transformer includes a capacitor connected in parallel with the primary winding.

7. The power receiver of claim 1 wherein said resonant transformer includes a capacitor connected in series with the primary winding between the impulse generator and the elevated terminal.

8. The power receiver of claim 1 further comprising multiple resonant transformers having primary windings connected in parallel between the ground terminal and the elevated terminal.

9. The power receiver of claim 8 wherein the resonant transformers have different resonant frequencies.

10. The power receiver of claim 9 wherein the resonant frequencies of the resonant transformers are all below 200 Hz.

11. The power receiver of claim 8 wherein the resonant frequencies of the resonant transformers are matched to respective Schumann resonances.

12. A ground terminal for a power receiver, said ground terminal comprising:
a ground shaft configured for insertion beneath the surface of the earth;
a hollow cylinder surrounding the ground shaft and having a plurality of openings; and
a plurality of ground wires connected at one end to the ground shaft said ground wires being wound around the ground shaft and having free ends protruding through respective openings in the hollow shaft so that rotation of the ground shaft relative to the hollow cylinder causes the ground wires to extend radially into the earth.

\* \* \* \* \*